(12) United States Patent
Togashi (10) Patent No.: US 7,623,337 B2
(45) Date of Patent: Nov. 24, 2009

(54) FEEDTHROUGH MULTILAYER CAPACITOR HAVING GROUNDING TERMINAL ELECTRODES ARRANGED ON AN OUTER SURFACE THEREOF THAT ARE CONNECTED TO ANOTHER GROUNDING TERMINAL ELECTRODE THROUGH A THROUGH-HOLE CONDUCTOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 20 days.

(21) Appl. No.: 11/822,954

(22) Filed: Jul. 11, 2007

(65) Prior Publication Data

US 2008/0019076 A1    Jan. 24, 2008

(30) Foreign Application Priority Data

Jul. 21, 2006  (JP) .......................... P2006-199862

(51) Int. Cl.
*H01G 4/005* (2006.01)
*H01G 4/228* (2006.01)

(52) U.S. Cl. ...................... 361/303; 361/309

(58) Field of Classification Search .............. 361/301.4, 361/302, 303, 306.1, 306.2, 306.3, 309, 310
See application file for complete search history.

(56) References Cited

U.S. PATENT DOCUMENTS 5,450,278 A    9/1995   Lee et al.
5,590,016 A *  12/1996  Fujishiro et al. ............ 361/313
7,035,079 B1 * 4/2006   Park et al. ..................... 361/303
2002/0041006 A1* 4/2002 Ahiko et al. ................. 257/532
2006/0120018 A1* 6/2006 Lee et al. .................. 361/306.3
2006/0152886 A1* 7/2006 Togashi et al. ........... 361/306.3
2006/0164789 A1* 7/2006 Togashi et al. ........... 361/306.3

FOREIGN PATENT DOCUMENTS

| JP | A 1-206615 | 8/1989 |
| JP | A-06-140283 | 5/1994 |
| JP | A-08-055758 | 2/1996 |

* cited by examiner

*Primary Examiner*—Eric Thomas
*Assistant Examiner*—David M Sinclair
(74) *Attorney, Agent, or Firm*—Oliff & Berridge, PLC (57) ABSTRACT

A feedthrough multilayer capacitor includes a capacitor body, at least two signal terminal electrodes, and at least one grounding terminal electrode. The capacitor body has a plurality of insulator layers laminated, a signal inner electrode and a first grounding inner electrode which are arranged so as to oppose each other with at least one insulator layer in between, and a second grounding inner electrode arranged so as to oppose the signal inner electrode or first grounding inner electrode with at least one insulator layer in between. The signal inner electrode is connected to two signal terminal electrodes, while the second grounding inner electrode is connected to one grounding terminal electrode. The first grounding inner electrode is connected to only the second grounding inner electrode through a through-hole conductor.

2 Claims, 5 Drawing Sheets

FEEDTHROUGH MULTILAYER CAPACITOR HAVING GROUNDING TERMINAL ELECTRODES ARRANGED ON AN OUTER SURFACE THEREOF THAT ARE CONNECTED TO ANOTHER GROUNDING TERMINAL ELECTRODE THROUGH A THROUGH-HOLE CONDUCTOR

BACKGROUND OF THE INVENTION

1. Field of the Invention

The present invention relates to a feedthrough multilayer capacitor.

2. Related Background Art

Known as this kind of feedthrough multilayer capacitor is one comprising a capacitor body in which insulator layers and inner electrodes for signals and grounding are alternately laminated, and terminal electrodes for signals and grounding formed on the capacitor body (see, for example, Japanese Patent Application Laid-Open No. h01-206615).

On the other hand, power supplies for central processing units (CPUs) mounted in digital electronic devices have been lowering their voltage while increasing their load current. This has made it very difficult for fluctuations in power voltage to be held under a tolerable level, whereby a multilayer capacitor known as decoupling capacitor has been connected to the power supplies. When the load current fluctuates transiently, the multilayer capacitor supplies a current to the CPU, thereby suppressing the fluctuation in power voltage.

Recently, as the CPUs have further been increasing their frequency, their load current has been becoming faster and greater. Therefore, the multilayer capacitors employed in decoupling capacitors have been demanded to increase their capacity and equivalent series resistance (ESR).

SUMMARY OF THE INVENTION

However, no consideration has been made for increasing the equivalent series resistance in the feedthrough multilayer capacitor described in Japanese Patent Application Laid-Open No. h01-206615. Further, all the inner electrodes are directly connected to terminal electrodes in the feedthrough multilayer capacitor described in Japanese Patent Application Laid-Open No. h01-206615. Therefore, the equivalent series resistance becomes smaller when the number of laminated layers is increased so as to enhance the capacitance in this feedthrough multilayer capacitor.

For overcoming the problem mentioned above, it is an object of the present invention to provide a feedthrough multilayer capacitor which can increase the equivalent series resistance.

Meanwhile, in a typical feedthrough multilayer capacitor, all the inner electrodes are connected to their corresponding terminal electrodes through lead portions. Therefore, the lead portions connected to the terminal electrodes exist by the number of inner electrodes, thereby reducing the equivalent series resistance. When the number of laminated insulator layers and inner electrode layers is made greater in order to increase the capacity of the feedthrough multilayer capacitor, the number of lead portions also increases. Since the resistance components of the lead portions connected to terminal electrodes are connected in parallel to the terminal electrodes, the equivalent series resistance of the feedthrough multilayer capacitor further decreases as the number of lead portions connected to the terminal electrodes increases. Thus, demands for greater capacity and greater equivalent series resistance in a feedthrough multilayer capacitor are contradictory to each other.

Therefore, the inventor conducted diligent studies concerning a feedthrough multilayer capacitor which can satisfy demands for increasing the capacity and equivalent series resistance. As a result, the inventor has found a new fact that the equivalent series resistance can be adjusted to a desirable value if inner electrodes are connected with a through-hole conductor while the number of lead portions can be changed, even when the number of laminated insulator layers and inner electrodes is held constant. The inventor has also found a new fact that the equivalent series resistance can be adjusted to a desirable value if inner electrodes are connected with a through-hole conductor while positions of lead portions in the laminating direction of the capacitor body can be changed. In particular, the equivalent series resistance can be adjusted such as to become greater if the number of lead portions is made smaller than that of inner electrodes.

In view of such results of studies, in one aspect, the present invention provides a feedthrough multilayer capacitor comprising: a capacitor body; at least two signal terminal electrodes arranged on an outer surface of the capacitor body; and at least one grounding terminal electrode arranged on the outer surface of the capacitor body; wherein the capacitor body has a plurality of insulator layers laminated, a signal inner electrode, a first grounding inner electrode, and a second grounding inner electrode; wherein the signal inner electrode and the first grounding inner electrode are arranged so as to oppose each other with at least one of the plurality of insulator layers in between; wherein the second grounding inner electrode is arranged so as to oppose the signal inner electrode or the first grounding inner electrode with at least one of the plurality of insulator layers in between; wherein the signal inner electrode is connected to the at least two signal terminal electrodes; wherein the second grounding inner electrode is connected to the at least one grounding terminal electrode; and wherein the first grounding inner electrode is connected to only the second grounding inner electrode through a through-hole conductor. Namely, a feedthrough multilayer capacitor is provided such as one comprising a capacitor body, at least two signal terminal electrodes arranged on an outer surface of the capacitor body, and at least one grounding terminal electrode arranged on the outer surface of the capacitor body; wherein the capacitor body has a plurality of insulator layers laminated, a signal inner electrode and a first grounding inner electrode arranged so as to oppose each other while holding therebetween at least one of the plurality of insulator layers, and a second grounding inner electrode arranged so as to oppose the signal inner electrode or the first grounding inner electrode while holding therebetween at least one of the plurality of insulator layers; wherein the signal inner electrode is connected to the at least two signal terminal electrodes; wherein the second grounding inner electrode is connected to the at least one grounding terminal electrode; and wherein the first grounding inner electrode is connected to only the second grounding inner electrode through a through-hole conductor.

In this feedthrough multilayer capacitor, the grounding inner electrodes include a first grounding inner electrode directly connected to a grounding terminal electrode, and a second grounding inner electrode not directly connected to the grounding terminal electrode. Therefore, this feedthrough multilayer capacitor can make the equivalent series resistance greater than that in the case where all the grounding inner electrodes are connected to the grounding terminal electrodes.

In another aspect, the present invention provides a feedthrough multilayer capacitor comprising a capacitor body in which a plurality of insulator layers and a plurality of inner electrodes are alternately laminated, and a plurality of terminal electrodes arranged on an outer surface of the capacitor body; wherein the plurality of inner electrodes include at least one signal inner electrode and a plurality of grounding inner electrodes; wherein the plurality of terminal electrodes include at least two signal terminal electrodes and at least one grounding terminal electrode; wherein at least one signal inner electrode is arranged so as to oppose at least one of the plurality of grounding inner electrodes while holding therebetween at least one of the plurality of insulator layers; wherein the plurality of grounding inner electrodes are connected to each other through a through-hole conductor; wherein the signal inner electrode is connected to the at least two signal terminal electrodes; and wherein at least one grounding inner electrode whose number is smaller than the total number of grounding inner electrodes by at least 1 in the plurality of grounding inner electrodes is connected to the at least one grounding terminal electrode.

In this feedthrough multilayer capacitor, only a part of grounding inner electrodes are connected to the grounding terminal electrode. Therefore, this feedthrough multilayer capacitor can make the equivalent series resistance greater than that in the case where all the grounding inner electrodes are connected to the grounding terminal electrodes.

The present invention can provide a feedthrough multilayer capacitor which can increase the equivalent series resistance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, a preferred embodiment will be explained in detail with reference to the accompanying drawings. In the explanation, the same constituents or those having the same functions will be referred to with the same numerals while omitting their overlapping explanations.

Figure 1:
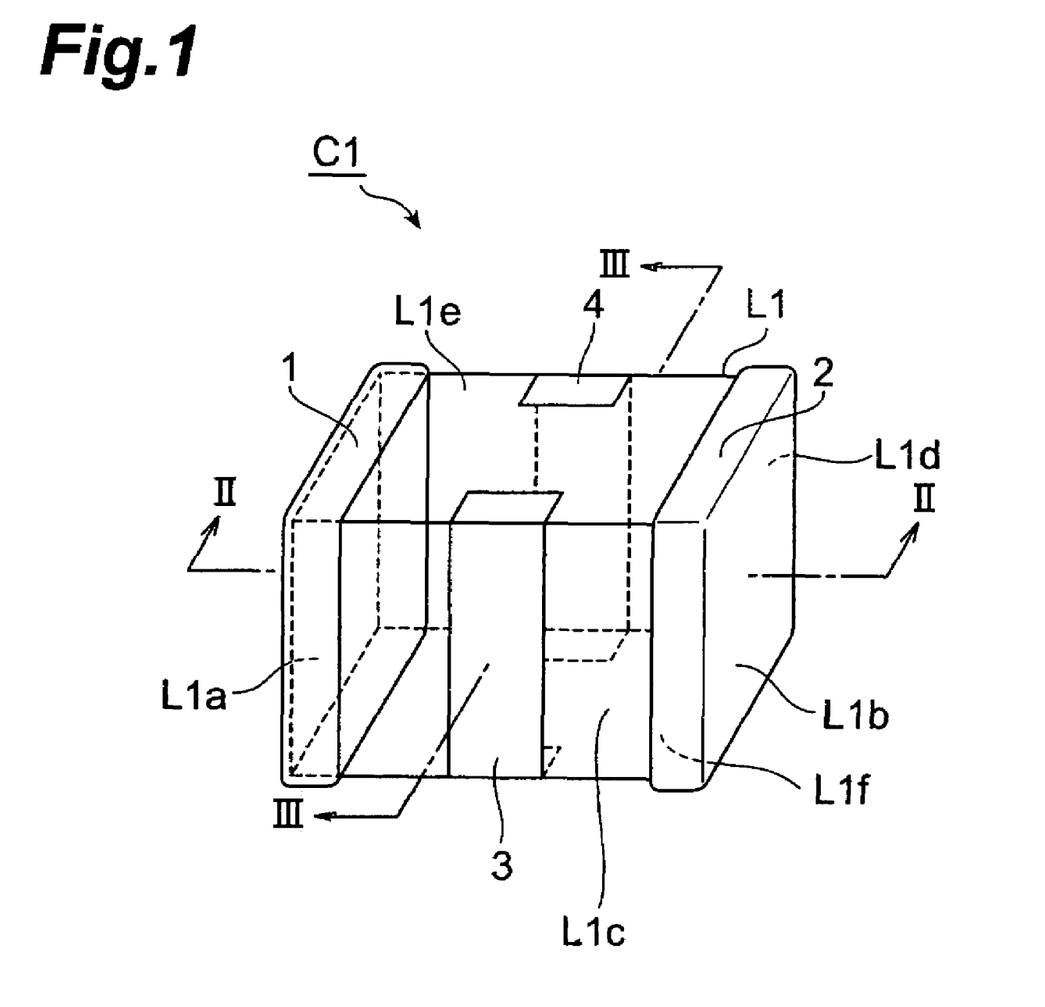
FIG. 1 is a perspective view of the feedthrough multilayer capacitor in accordance with an embodiment.
Figure 2:
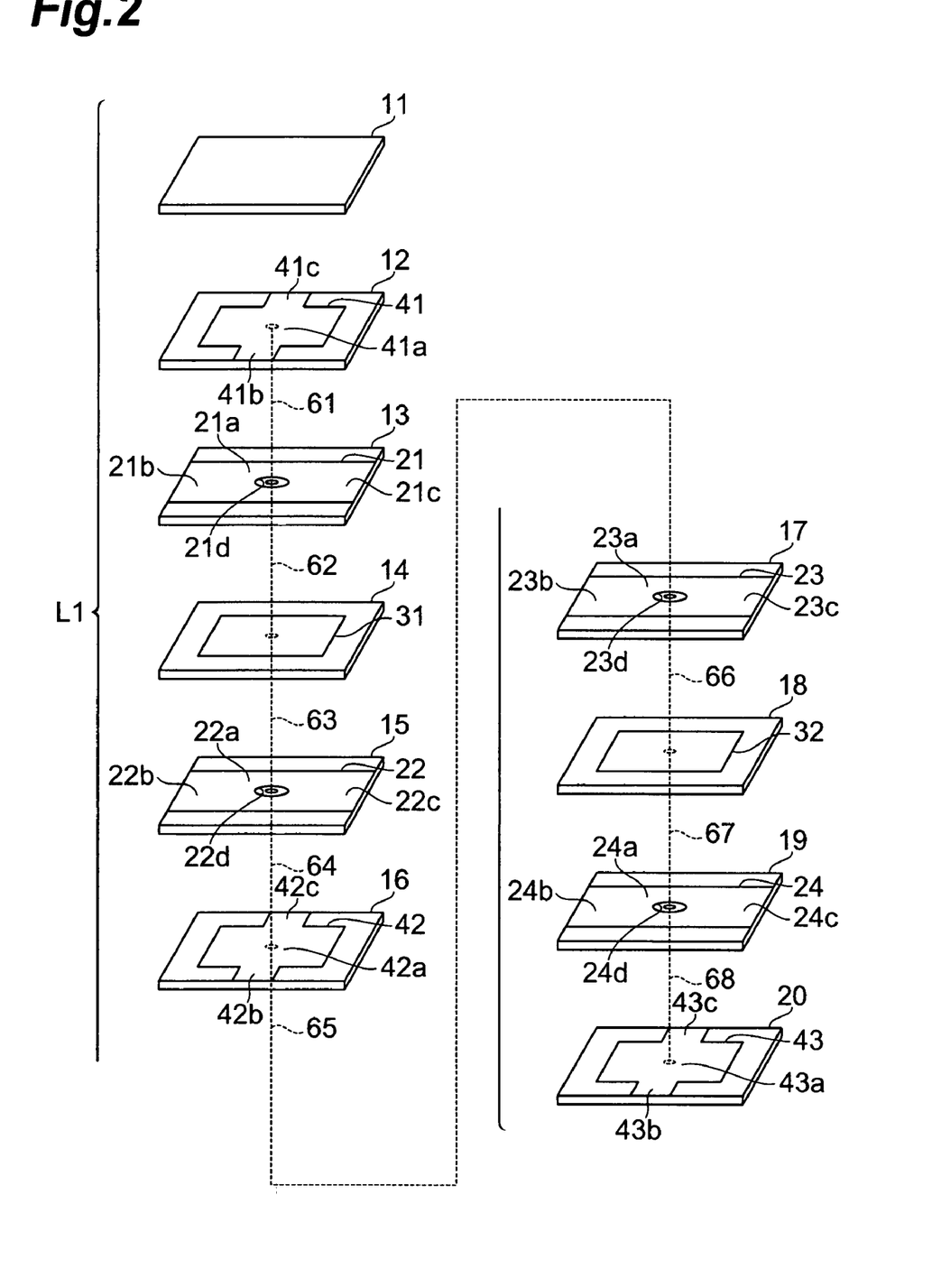
FIG. 2 is an exploded perspective view of the capacitor body included in the feedthrough multilayer capacitor in accordance with the embodiment.
Figure 3:
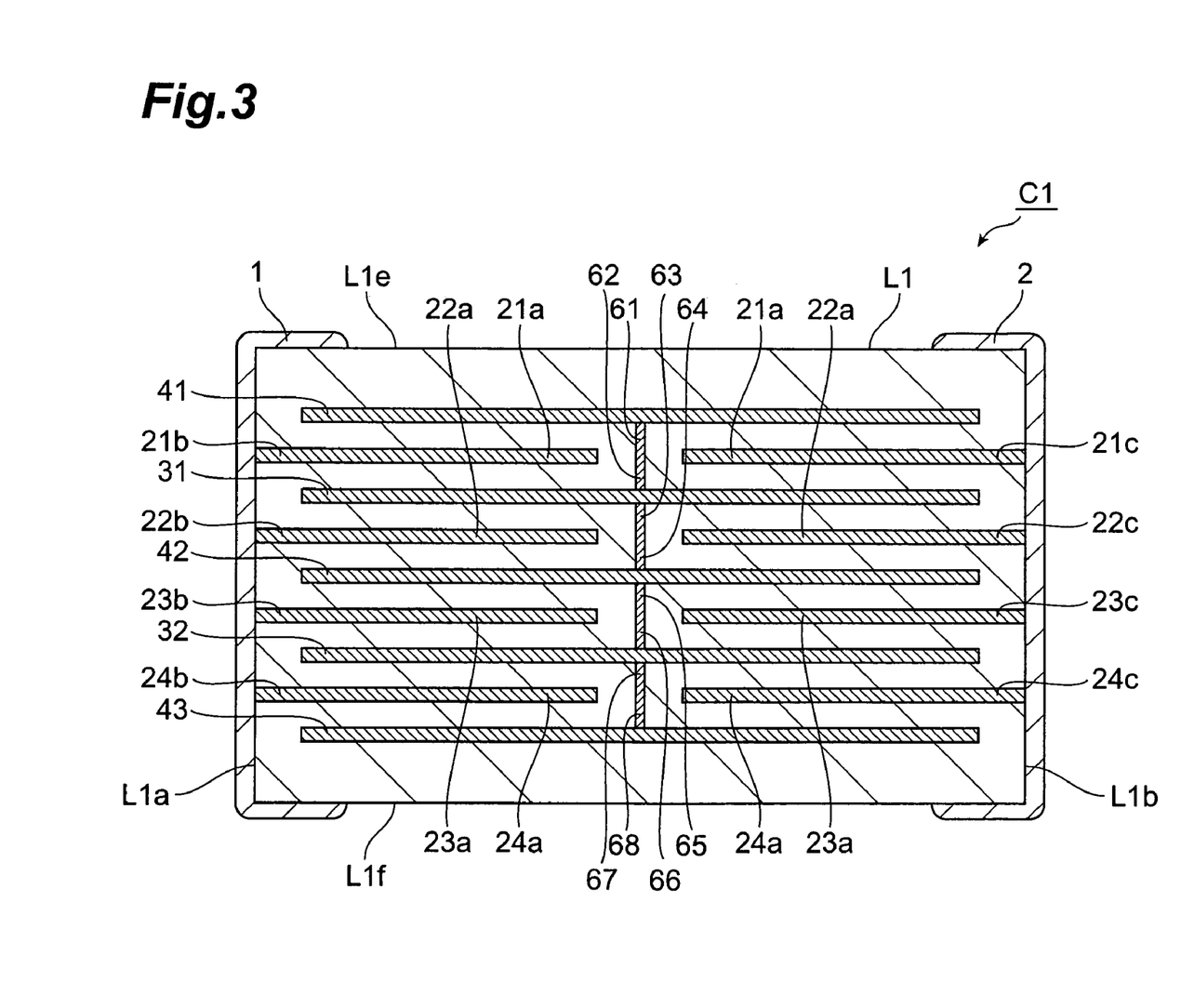
FIG. 3 is a view for explaining the structure of a cross section of the feedthrough multilayer capacitor taken along the line II-II in FIG. 1.
Figure 4:
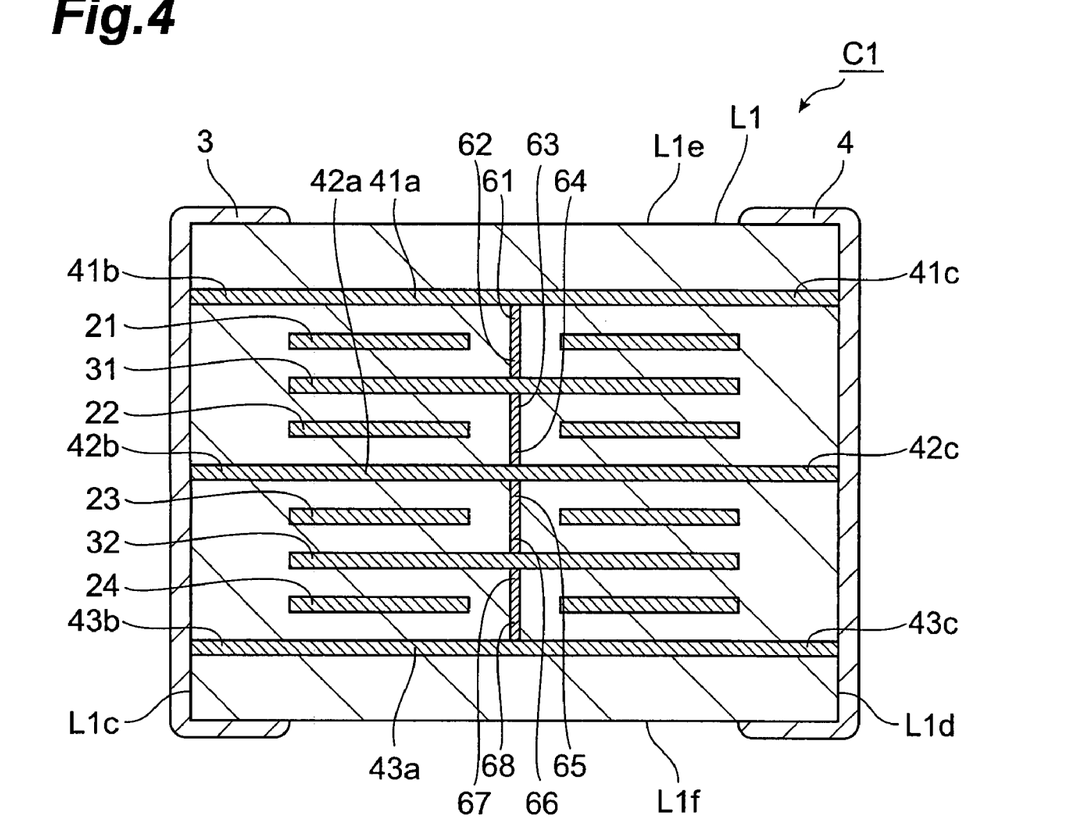
FIG. 4 is a view for explaining the structure of a cross section of the feedthrough multilayer capacitor taken along the line III-III in FIG. 1.

With reference to FIGS. 1 to 4, the structure of feedthrough multilayer capacitor C1 in accordance with a first embodiment will be explained. FIG. 1 is a perspective view of the feedthrough multilayer capacitor in accordance with the embodiment. FIG. 2 is an exploded perspective view of the capacitor body included in the feedthrough multilayer capacitor in accordance with the embodiment. FIG. 3 is a view for explaining the structure of a cross section of the feedthrough multilayer capacitor taken along the line II-II in FIG. 1. FIG. 4 is a view for explaining the structure of a cross section of the feedthrough multilayer capacitor taken along the line III-III in FIG. 1.

As shown in FIG. 1, the feedthrough multilayer capacitor C1 in accordance with the embodiment comprises a capacitor body L1, signal terminal electrodes 1, 2 arranged on the outer surface of the capacitor body L1, and grounding terminal electrodes 3, 4 arranged on the outer surface of the capacitor body L1. The signal terminal electrodes 1, 2 and grounding terminal electrodes 3, 4 are formed, for example, by applying and baking a conductive paste, which contains a conductive metal powder and a glass frit, onto the outer surface of the capacitor body. A plating layer may be formed on the baked terminal electrodes when necessary. The signal terminal electrodes 1, 2 and grounding terminal electrodes 3, 4 are formed such as to be electrically insulated from each other on the surface of the capacitor body L1.

As shown in FIG. 1, the capacitor body L1 is shaped like a rectangular parallelepiped and has oblong first and second main faces L1$e$, L1$f$ opposing each other, first and second side faces L1$a$, L1$b$ extending in the shorter side direction of the first and second main faces L1$e$, L1$f$ so as to connect the first and second main faces L1$e$, L1$f$ to each other and opposing each other, and third and fourth side faces L1$c$, L1$d$ extending in the longer side direction of the first and second main faces L1$e$, L1$f$ so as to connect the first and second main faces L1$e$, L1$f$ to each other and opposing each other.

The signal terminal electrode 1 is arranged on the first side face L1$a$ of the capacitor body L1. The signal terminal electrode 2 is arranged on the second side face L1$b$ opposing the first side face L1$a$ of the capacitor body L1. The signal terminal electrode 1 arranged on the first side face L1$a$ and the signal terminal electrode 2 arranged on the second side face L1$b$ oppose each other in the direction in which the first side face L1$a$ and the second side face L1$b$ oppose each other.

The signal terminal electrode 1 covers the whole first side face L1$a$ of the capacitor body L1 and a portion of each of the other faces (first and second main faces L1$e$, L1$f$ and third and fourth side faces L1$c$, L1$d$) adjoining the first side face L1$a$. The signal terminal electrode 2 covers the whole second side face L1$b$ of the capacitor body L1 and a portion of each of the other faces (first and second main faces L1$e$, L1$f$ and third and fourth side faces L1$c$, L1$d$) adjoining the second side face L1$b$.

The grounding terminal electrode 3 is arranged on the third side face L1$c$ of the capacitor body L1. The grounding terminal electrode 4 is arranged on the fourth side face L1$d$ of the capacitor body L1. The grounding terminal electrode 3 arranged on the third side face L1$c$ and the grounding terminal electrode 4 arranged on the fourth side face L1$d$ oppose each other in the direction in which the third side face L1$c$ and fourth side face L1$d$ oppose each other.

As shown in FIG. 2, the capacitor body L1 has a plurality of (10 in this embodiment) insulator layers 11 to 20 and a plurality of (9 in this embodiment) inner electrodes 21 to 24, 31, 32, 41 to 43. Each of the insulator layers 11 to 20 is constituted by a sintered body of a ceramic green sheet including a dielectric ceramic, for example. In the actual feedthrough multilayer capacitor C1, the dielectric layers 11 to 20 are integrated to such an extent that their boundaries are indiscernible.

The plurality of inner electrodes 21 to 24, 31, 32, 41 to 43 include a plurality of (4 in this embodiment) signal inner electrodes 21 to 24 and a plurality of (5 in this embodiment) grounding inner electrodes 31, 32, 41 to 43. The grounding inner electrodes 31, 32, 41 to 43 include the first inner electrodes 31, 32 and second grounding inner electrodes 41 to 43. Each of the inner electrodes 21 to 24, 31, 32, 41 to 43 is constituted by a sintered body of a conductive paste, for example.

The signal inner electrodes 21 to 24 and the first grounding terminal electrodes 31, 32 are arranged so as to oppose each other, while each pair holding with one of the insulator layers 13, 14, 17, 18 in between. Namely, the signal inner electrode 21 and the first grounding inner electrode 31 oppose each other with the insulator layer 13 interposed between. The signal inner electrode 22 and the first grounding inner electrode 31 oppose each other with the insulator layer 14 interposed between. The signal inner electrode 23 and the first grounding inner electrode 32 oppose each other with the insulator layer 17 interposed between. The signal inner electrode 24 and the first grounding inner electrode 32 oppose each other with the insulator layer 18 interposed between.

The signal inner electrodes 21 to 24 and the second grounding inner electrodes 41 to 43 are arranged so as to oppose each other, while each pair holding one of the insulator layers 12, 15, 16, 19 in between. Namely, the signal inner electrode 21 and the second grounding inner electrode 41 oppose each other with the insulator layer 12 interposed between. The signal inner electrode 22 and the second grounding inner electrode 42 oppose each other with the insulator layer 15 interposed between. The signal inner electrode 23 and the second grounding inner electrode 42 oppose each other with the insulator layer 16 interposed between. The signal inner electrode 24 and the second grounding inner electrode 43 oppose each other with the insulator layer 19 interposed between.

The signal inner electrodes 21 to 24 include rectangular main electrode portions 21a to 24a whose longer side direction is parallel to the longer side direction of the first and second main faces L1e, L1f of the capacitor body L1, lead portions 21b to 24b extending from the main electrode portions 21a to 24a to the first side face L1a, and lead portions 21c to 24c extending from the main electrode portions 21a to 24a to the second side face L1b. The main electrode portions 21a to 24a of the signal inner electrodes 21 to 24 are formed with apertures 21d to 24d so as to expose the insulator layers 13, 15, 17, 19, respectively.

The lead portions 21b to 24b, 21c to 24c are formed such as to have the same width as that of the main electrode portions 21a to 24a in the direction in which the third side face L1c and the fourth side face L1d oppose each other.

As shown in FIG. 3, the lead portions 21b to 24b extending so as to reach the first side face L1a of the capacitor body L1 are connected to the signal terminal electrode 1. Similarly, as shown in FIG. 3, the lead portions 21c to 24c extending so as to reach the second side face L1b of the capacitor body L1 are connected to the signal terminal electrode 2.

Each of the first grounding inner electrodes 31, 32 has a rectangular form whose longer and shorter side directions are parallel to the longer and shorter side directions of the first and second main faces L1e, L1f of the capacitor body L1, respectively. Each of the first grounding inner electrodes 31, 32 is formed at a position separated by predetermined distances from the first to fourth side faces of the capacitor body L1.

The second grounding inner electrodes 41 to 43 include rectangular main electrode portions 41a to 43a whose longer side direction is parallel to the longer side direction of the first and second main faces L1e, L1f of the capacitor body L1, lead portions 41b to 43b extending from the main electrode portions 41a to 43a to the third side face L1c, and lead portions 41c to 43c extending from the main electrode portions 41a to 43a to the fourth side face L1d.

As shown in FIG. 4, the lead portions 41b to 43b extending so as to reach the third side face L1c of the capacitor body L1 are connected to the grounding terminal electrode 3. Similarly, as shown in FIG. 4, the lead portions 41c to 43c extending so as to reach the fourth side face L1d of the capacitor body L1 are connected to the grounding terminal electrode 4.

Thus, in the feedthrough multilayer capacitor C1 in accordance with this embodiment, three second grounding inner electrodes 41 to 43 whose number is at least 1 but smaller than the total number (5 in this embodiment) of the grounding inner electrodes 31, 32, 41 to 43 by at least 1 in the plurality of grounding inner electrodes 31, 32, 41 to 43 are connected to the grounding terminal electrodes 3, 4.

In the insulator layer 12, a through-hole conductor 61 penetrating through the insulator layer 12 in the thickness direction is formed at a position corresponding to substantially the center of the aperture 21d of the signal inner electrode 21. The through-hole conductor 61 is physically connected to the second grounding inner electrode 41. The through-hole conductor 61 and the second grounding inner electrode 41 are electrically connected to each other.

In the insulator layer 13, a through-hole conductor 62 penetrating through the insulator layer 13 in the thickness direction is formed at a position corresponding to substantially the center of the aperture 21d of the signal inner electrode 21. The through-hole conductor 62 is physically connected to the first grounding inner electrode 31. The through-hole conductor 62 and the first grounding inner electrode 31 are electrically connected to each other.

In the insulator layer 14, a through-hole conductor 63 penetrating through the insulator layer 14 in the thickness direction is formed at a position corresponding to substantially the center of the aperture 22d of the signal inner electrode 22. The through-hole conductor 63 is physically connected to the first grounding inner electrode 31. The through-hole conductor 63 and the first grounding inner electrode 31 are electrically connected to each other.

In the insulator layer 15, a through-hole conductor 64 penetrating through the insulator layer 15 in the thickness direction is formed at a position corresponding to substantially the center of the aperture 22d of the signal inner electrode 22. The through-hole conductor 64 is physically connected to the second grounding inner electrode 42. The through-hole conductor 64 and the second grounding inner electrode 42 are electrically connected to each other.

In the insulator layer 16, a through-hole conductor 65 penetrating through the insulator layer 16 in the thickness direction is formed at a position corresponding to substantially the center of the aperture 23d of the signal inner electrode 23. The through-hole conductor 65 is physically connected to the second grounding inner electrode 42. The through-hole conductor 65 and the second grounding inner electrode 42 are electrically connected to each other.

In the insulator layer 17, a through-hole conductor 66 penetrating through the insulator layer 17 in the thickness direction is formed at a position corresponding to substantially the center of the aperture 23d of the signal inner electrode 23. The through-hole conductor 66 is physically connected to the first grounding inner electrode 32. The through-hole conductor 66 and the first grounding inner electrode 32 are electrically connected to each other.

In the insulator layer 18, a through-hole conductor 67 penetrating through the insulator layer 18 in the thickness direction is formed at a position corresponding to substantially the center of the aperture 24d of the signal inner electrode 24. The through-hole conductor 67 is physically connected to the first grounding inner electrode 32. The through-hole conductor 67 and the first grounding inner electrode 32 are electrically connected to each other.

In the insulator layer 19, a through-hole conductor 68 penetrating through the insulator layer 19 in the thickness direction is formed at a position corresponding to substantially the center of the aperture 24d of the signal inner electrode 24. The through-hole conductor 68 is physically connected to the second grounding inner electrode 43. The through-hole conductor 68 and the second grounding inner electrode 43 are electrically connected to each other.

The through-hole conductors 61 and 62 are electrically connected to each other in the state where the insulator layers 12, 13 are laminated. The through-hole conductors 62 and 63 are electrically connected to each other in the state where the insulator layers 13, 14 are laminated. The through-hole conductors 63 and 64 are electrically connected to each other in the state where the insulator layers 14, 15 are laminated. The through-hole conductors 64 and 65 are electrically connected to each other in the state where the insulator layers 15, 16 are laminated. The through-hole conductors 65 and 66 are electrically connected to each other in the state where the insulator layers 16, 17 are laminated. The through-hole conductors 66 and 67 are electrically connected to each other in the state where the insulator layers 17, 18 are laminated. The through-hole conductors 67 and 68 are electrically connected to each other in the state where the insulator layers 18, 19 are laminated.

Namely, when the insulator layers 11 to 20 are laminated, the through-hole conductors 61 to 68 are arranged substantially linearly in a row in the laminating direction, and are electrically connected to each other, so as to construct an energizing path. As shown in FIGS. 3 and 4, the plurality of grounding inner electrodes 31, 32, 41 to 43 are connected to each other through the through-hole conductors 61 to 68. The first grounding inner electrodes 31, 32 are connected to only the second grounding inner electrodes 41 to 43 through the through-hole conductors 61 to 68.

Thus, in the feedthrough multilayer capacitor C1, not all the grounding inner electrodes 31, 32, 41 to 43 but only a part thereof (second grounding inner electrodes 41 to 43) are directly connected to the terminal electrodes 3, 4, while the rest (first grounding inner electrodes 31, 32) are electrically connected to the terminal electrodes 3, 4 through the second grounding inner electrodes 41 to 43 and through-hole conductors 61 to 68.

Figure 5:
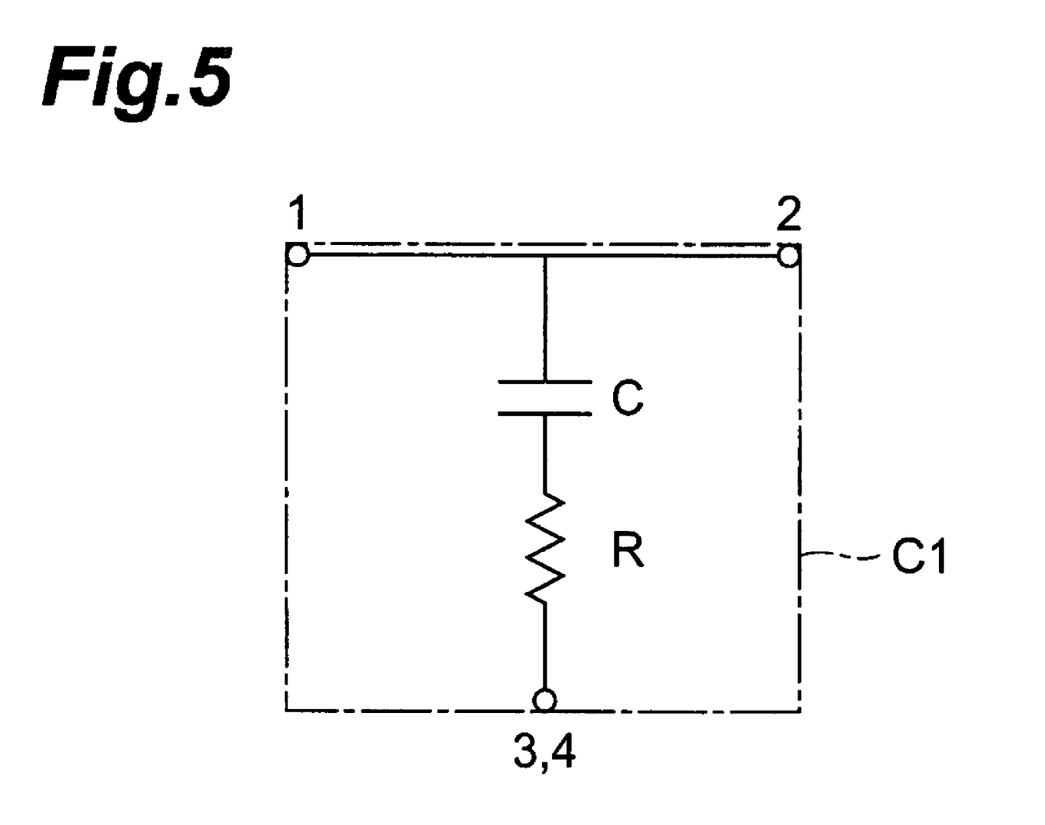
FIG. 5 is an equivalent circuit diagram of the feedthrough multilayer capacitor in accordance with the embodiment.

FIG. 5 shows an equivalent circuit diagram of the feedthrough multilayer capacitor C1. The equivalent circuit diagram of FIG. 5 represents a case where the signal terminal electrodes 1, 2 are connected to a signal lead, while the grounding terminal electrodes 3, 4 are connected to the ground.

The equivalent series resistance R obtained in the feedthrough multilayer capacitor C1 is connected in series to the capacitance C of the feedthrough multilayer capacitor C1 on the side of the grounding terminal electrodes 3, 4.

In the feedthrough multilayer capacitor C1, the first grounding inner electrodes 31, 32 are connected to only the second grounding inner electrodes 41 to 43 through the through-hole conductors 61 to 68, but not directly to the grounding terminal electrodes 3, 4. Namely, the number of second grounding inner electrodes 41 to 43 connected to the grounding terminal electrodes 3, 4 through the lead portions 41b to 43b, 41c to 43c is 3, which is smaller than the total number of the first and second grounding inner electrodes 31, 32, 41 to 43. Therefore, the feedthrough multilayer capacitor C1 can make the equivalent series resistance greater than that in the case where all the grounding inner electrodes are connected to their corresponding grounding terminal electrodes through lead portions. Also, a greater equivalent series resistance prevents impedance from dropping drastically at a resonance frequency, thus making it possible to increase the bandwidth.

This embodiment sets the equivalent series resistance of the feedthrough multilayer capacitor C1 to a desirable value by adjusting one or both of the number and position of second grounding inner electrodes 41 to 43 connected to the grounding terminal electrodes 3, 4 through the lead portions 41b to 43b, 41c to 43c, whereby the equivalent series resistance can be regulated easily and accurately.

The feedthrough multilayer capacitor C1 also restrains the equivalent series resistance from becoming small, even when the capacitance is enhanced by increasing the number of laminated signal inner electrodes and first grounding inner electrodes so as to respond to greater capacity.

When the feedthrough multilayer capacitor C1 is connected to a circuit board or the like such as to yield the equivalent circuit shown in FIG. 5, the capacitance C and the resistance R connected in series to the capacitance C are connected to the side of the grounding terminal electrodes 3, 4. Therefore, this feedthrough multilayer capacitor C1 is favorable as a capacitor for a power supply.

In the feedthrough multilayer capacitor C1, the signal terminal electrodes 1, 2 oppose each other in the direction in which the first and second side faces L1a, L1b oppose each other. The grounding terminal electrodes 3, 4 oppose each other in the direction in which the third and fourth side faces L1c, L1d oppose each other. These make it easy to connect the signal terminal electrodes 1, 2 to a linear signal lead, and the grounding terminal electrodes 3, 4 to a linear ground connecting lead, for example, in the feedthrough multilayer capacitor C1, whereby its mounting is easy.

Though a preferred embodiment of the present invention is explained in detail in the foregoing, the present invention is not limited to the above-mentioned embodiment. For example, the number of signal terminal electrodes connected to the signal inner electrodes 21 to 24 may be 3 or more without being restricted to the number stated in the above-mentioned embodiment. The number of grounding terminal electrodes connected to the second grounding inner electrodes 41 to 43 may be 1 or 3 or more without being restricted to the number stated in the above-mentioned embodiment, for example.

The number of through-hole conductors 61 to 68 may be adjusted such that the equivalent series resistance of the feedthrough multilayer capacitor C1 becomes a desirable value. In this case, the equivalent series resistance of the feedthrough multilayer capacitor C1 can be regulated more accurately. For example, the number of through-hole conductors 61 to 68 in the feedthrough multilayer capacitor C1 in accordance with this embodiment can be set to 2 or more. In this case, the grounding inner electrodes 31, 32, 41 to 43 are electrically connected to each other through at least two energizing paths whose number is the same as that of the through-hole conductors 61 to 68.

The positions where the through-hole conductors 61 to 68 are formed are not limited to those stated in the above-mentioned embodiment. For example, they may be outside of the outer contours of the signal inner electrodes 21 to 24 positioned on the insulator layers 13, 15, 17, 19 formed with the through-hole conductors 61 to 68, respectively.

The arrangements of the signal terminal electrodes 1, 2 and grounding terminal electrodes 3, 4 are not limited to those described in the above-mentioned embodiment as long as they are disposed on the outer surface of the capacitor body. For example, it is not necessary for the signal terminal electrodes to oppose each other in the direction in which the first and second side faces of the capacitor body oppose each other. For example, it is not necessary for the grounding terminal electrodes to oppose each other in the direction in which the third and fourth side faces of the capacitor body oppose each other.

The number of laminated insulator layers 11 to 20 and the number of laminated inner electrodes 21 to 24, 31, 32, 41 to 43 are not limited to those stated in the above-mentioned embodiment. The forms of the inner electrodes 21 to 24, 31, 32, 41 to 43 are not limited to those stated in the above-mentioned embodiment. For example, the lead portions 21b to 24b, 21c to 24c of the signal inner electrodes 21 to 24 may have a width different from that of the main electrode portions 21a to 24a in the direction in which the third side face L1c and the fourth side face L1d oppose each other.

The number and position in the laminating direction of the second grounding inner electrodes 41 to 43 connected to the grounding terminal electrodes through lead portions are not limited to those stated in the above-mentioned embodiment. Namely, it will be sufficient if the plurality of grounding inner electrodes include at least one first grounding inner electrode and at least one second grounding inner electrode, while the number of second grounding inner electrodes is smaller than the total number of the grounding inner electrodes by at least 1 in the plurality of grounding inner electrodes.

The second grounding inner electrodes 41 to 43 may be arranged so as to oppose the first grounding inner electrodes with the insulator layers in between, instead of opposing the signal inner electrodes with the insulator layers in between.

The number of insulator layers interposed between the signal inner electrodes 21 to 24 and the first grounding inner electrodes 31, 32 may be 2 or more, for example, without being restricted to the number stated in the above-mentioned embodiment. The number of insulator layers held between the second grounding inner electrodes 41 to 43 and the signal inner electrodes 21 to 24 may be 2 or more, for example, without being restricted to the number stated in the above-mentioned embodiment.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A feedthrough multilayer capacitor comprising:
    a capacitor body;
    at least two signal terminal electrodes arranged on an outer surface of the capacitor body; and
    at least one grounding terminal electrode arranged on the outer surface of the capacitor body;
    wherein the capacitor body has a plurality of insulator layers laminated, a signal inner electrode, a first grounding inner electrode, and a second grounding inner electrode;
    wherein the signal inner electrode and the first grounding inner electrode are arranged so as to oppose each other with at least one of the plurality of insulator layers in between;
    wherein the second grounding inner electrode is arranged so as to oppose the signal inner electrode or the first grounding inner electrode with at least one of the plurality of insulator layers in between;
    wherein the signal inner electrode is connected to the at least two signal terminal electrodes;
    wherein the second grounding inner electrode is one of directly and mechanically connected to the at least one grounding terminal electrode; and
    wherein the first grounding inner electrode is not one of connected directly and mechanically to the at least one grounding terminal electrode and is connected electrically to only the second grounding inner electrode through a through-hole conductor.

2. A feedthrough multilayer capacitor comprising a capacitor body and a plurality of terminal electrodes arranged on an outer surface of the capacitor body, the capacitor body including a plurality of insulator layers and a plurality of inner electrodes alternately laminated with each other;
    wherein the plurality of inner electrodes include at least one signal inner electrode and a plurality of grounding inner electrodes;
    wherein the plurality of terminal electrodes include at least two signal terminal electrodes and at least one grounding terminal electrode;
    wherein the at least one signal inner electrode is arranged so as to oppose at least one of the plurality of grounding inner electrodes with at least one of the plurality of insulator layers in between;
    wherein the plurality of grounding inner electrodes are connected to each other through a through-hole conductor;
    wherein the signal inner electrode is connected to the at least two signal terminal electrodes; and
    wherein only at least one grounding inner electrode whose number is smaller than the total number of grounding inner electrodes by at least 1 in the plurality of grounding inner electrodes is one of directly and mechanically connected to the at least one grounding terminal electrode.

* * * * *